United States Patent [19]

Fliege

[11] Patent Number: 5,675,222
[45] Date of Patent: Oct. 7, 1997

[54] ELECTRIC ROAD MOTOR VEHICLE WITH SWITCHABLE WINDING ELECTRIC MOTOR PROPULSION SYSTEM

[75] Inventor: Hans Fliege, Obertheres, Germany

[73] Assignee: Fichtel & Sachs AG, Schweinfurt, Germany

[21] Appl. No.: 523,000

[22] Filed: Sep. 1, 1995

[30] Foreign Application Priority Data

Sep. 2, 1994 [DE] Germany ............... 44 31 347.0

[51] Int. Cl.$^6$ ................................. H02P 1/00
[52] U.S. Cl. ................... 318/139; 180/337; 180/65.1; 180/342
[58] Field of Search ............... 318/139, 798–815, 318/771; 364/424.01, 424.1; 180/337, 342, 65.1, 234, 174

[56] References Cited

U.S. PATENT DOCUMENTS

| | | |
|---|---|---|
| 4,221,999 | 9/1980 | Gausman, Jr. . |
| 4,444,285 | 4/1984 | Stewart et al. ............ 180/65.1 X |
| 4,809,803 | 3/1989 | Ahern et al. ............ 180/65.1 X |
| 4,916,376 | 4/1990 | Kume et al. . |
| 5,034,675 | 7/1991 | Nerowski et al. . |
| 5,155,686 | 10/1992 | Shiraishi et al. ............ 364/424.01 X |
| 5,457,632 | 10/1995 | Tagawa et al. ............ 364/424.01 X |

FOREIGN PATENT DOCUMENTS

| | | |
|---|---|---|
| 0181938 | 5/1986 | European Pat. Off. . |
| 0334112 | 9/1989 | European Pat. Off. . |
| 0340686 | 11/1989 | European Pat. Off. . |
| 0547243 | 6/1993 | European Pat. Off. . |
| 2756459 | 6/1978 | Germany . |
| 4133059 | 4/1993 | Germany . |
| 4244721 | 4/1994 | Germany . |
| 4308836 | 9/1994 | Germany . |
| 1450147 | 9/1976 | United Kingdom . |
| 8201104 | 4/1982 | WIPO . |

OTHER PUBLICATIONS

"A Wide Constant Power Range Vector–Controlled ac Motor Drive Using Winding Changeover Technique", IEEE Transactions on Industry Appln. vol. 27, 1991, pp. 934–939.
"Das elektrische Getriebe von Magnet–Motor für PKW und Omnibusse", VDI Berichte Nr. 878, 1991, Starnberg, pp. 611–622.
"Niederspannungs—schalt geräte", Siemens Aktiengesellschaft, 1973, Schmelcher, pp. 74, 75, 88–95, 122 and 123.
"Niederspannungs—Leistungs schalter", Springer—Verlag, 1970, Franken, pp. 111–113, 157.

*Primary Examiner*—Karen Masih
*Attorney, Agent, or Firm*—Nils H. Ljungman and Associates

[57] ABSTRACT

An electric road motor vehicle with a switchable winding electric motor propulsion system, a switchable winding electric motor propulsion system in an electric road motor vehicle, and a switchable winding electric motor propulsion system for a motor vehicle. For the optimization of an electric motor propulsion system of a vehicle, the electric motor equipped with a rotary field winding is connected through a switching system to an electronic converter, so that due to the switching system, the number of phase windings of the rotary field winding to be connected to the individual output connections can be changed. The switching system is controlled by a control circuit through a actuator. The control circuit also controls the converter and deactivates the driver currents fed to the rotary field winding, while it switches over the switching system through the actuator. The switching system can thereby be made simpler and smaller. The switching system including the actuator is combined into a unit with the electric motor.

23 Claims, 2 Drawing Sheets

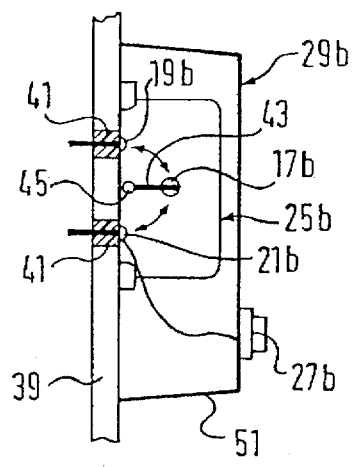
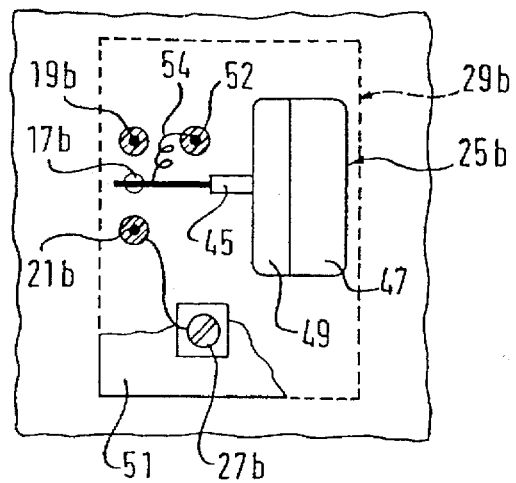
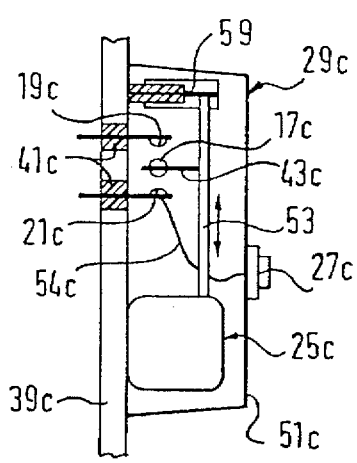
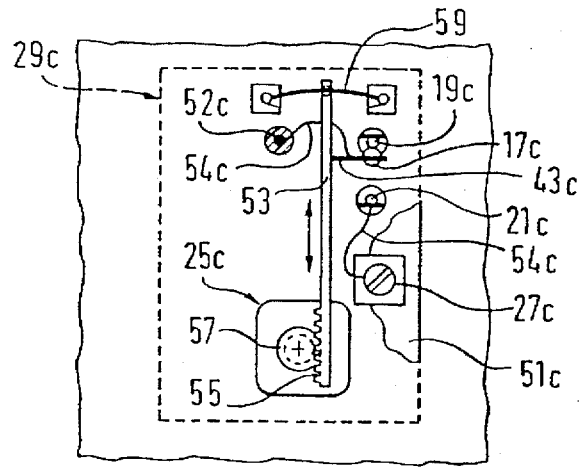
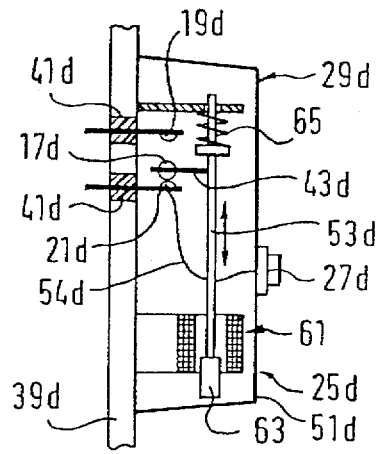
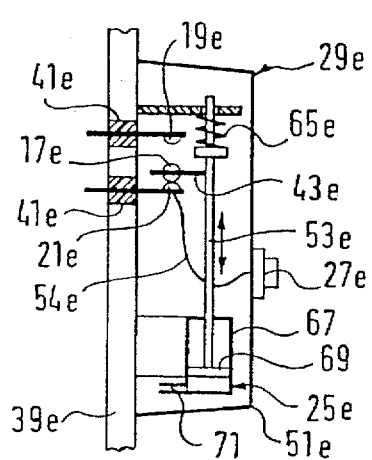

ELECTRIC ROAD MOTOR VEHICLE WITH SWITCHABLE WINDING ELECTRIC MOTOR PROPULSION SYSTEM

BACKGROUND OF THE INVENTION

1. Field of the Invention

The present invention relates generally to an electric road motor vehicle with a switchable winding electric motor propulsion system. The present invention also generally relates to an electric motor propulsion system for a vehicle, in particular for a vehicle which does not travel on rails, and the electric motor of which has a rotary field winding with a switchable winding.

2. Background Information

DE-A-41 33 059 and the publication "VDI Berichte" (No. 878, 1991, Pages 611–622) describe vehicles which do not travel on rails and are driven by electric motors, where the wheels of the vehicle are propelled individually by electric motors. The electric motors are rotary field motors with a rotary field winding, the rotary field winding being divided into several phase windings which are fed from a common converter or from several converters corresponding to the individual motors with phase-shifted, pulsating driver currents. The pulsating driver currents can be alternating currents, but they can also be direct currents generated with a pulse wave shape. The converters, which are electronic converters which control the pulsation rate and possibly also the amplitude of the driver currents by means of electric semiconductor valves, are for their part controlled by the vehicle control system, e.g. by means of an accelerator pedal or a similar device. The converters are powered by an on-board direct current system which, as described in the above referenced publications, can be a generator powered by an internal combustion engine, but can also be a rechargeable storage battery.

The electric motors in question must generally be designed for comparatively high levels of performance when they are used for vehicle propulsion. But the electric motors must generally simultaneously be designed so that they are as compact as possible. The pulsation frequency at which the driver currents are generated by the converter must also generally be relatively high (e.g. 2 KHz), so that they can regulate both the traction operation of the vehicle and the motor currents with sufficient accuracy. Although rotary field motors of any type can be used for the electric propulsion of a motor vehicle as described above, permanent magnet external-rotor motors have been found to be particularly well-suited to the task. DE-A-42 44 721, for example, discloses that a permanent magnet external-rotor motor can be cooled by an integrated cooling circuit, and the output stage solid state switching device of the converter can be located near the rotary field winding of the internal stator of the motor. Such motors have approximately the shape of a flat circular cylinder, whereby the connecting elements of the windings and of the solid state switching device are located on an axial end wall of the stator.

The operating characteristics, e.g. the torque and speed of rotation, are a function of the electric loading generated by the driver currents in the rotary field winding. EP-A-340 686 discloses that there can be separate converters corresponding to the phase windings of a rotary field motor, to which different numbers of phase windings and different circuit configurations can be connected by means of a number of controllable switches. By changing the number of phase windings connected in series, the torque and the maximum speed of rotation which can be achieved by the motor can be adjusted to the operating conditions. The system disclosed in EP-A-340 686 of course makes possible the desired optimization of the efficiency of the propulsion system, but it is comparatively complex and expensive.

OBJECT OF THE INVENTION

An object of the present invention is to provide an electric motor propulsion system for a vehicle in which the circuit configuration in which the phase windings of an electric motor with a rotary field winding are fed by driver currents can also be modified during operation. The manufacturing costs in terms of parts for this system should also be kept as low as possible.

SUMMARY OF THE INVENTION

The present invention, in accordance with at least one preferred embodiment, is based on an electric motor propulsion system for a vehicle, comprising:

- at least one electric motor with a rotary field winding which is divided into several phase windings,
- an electronic converter system which delivers pulsating driver currents of different phases to several output terminal connections,
- a system of mechanical switches connecting the phase windings of the electric motor to the output terminal connections, by means of which the number of phase windings connected to each of the output terminal connections can be changed,
- an actuator system for the actuation of the switches, and
- a control circuit which controls the actuator system.

On such an electric motor propulsion system, the present invention teaches, in accordance with at least one preferred embodiment, that the control circuit also controls the converter system and reduces the amplitude of the driver currents supplied to the output terminal connections, while the control circuit changes the position of the switches by controlling the actuator system.

The present invention makes it possible to distribute the driver currents to a changeable number of phase windings, and thus to optimize the efficiency of the electric motor over a rather wide range of operating parameters. For example, by splitting the driver currents supplied by the converter system over two or more phase windings, the maximum speed of rotation of the motor can be increased at the expense of its torque by the reduction of the electric loading which occurs when the currents are split.

On the other hand, by connecting the phase windings in series, the torque can be increased at the expense of the maximum achievable speed of rotation. On a rotary field motor designed for three phases, this can be achieved by a switchover of the phase windings between a delta connection and a star connection, whereby a higher torque can be achieved in a star or "wye" connection of the phase windings, while higher maximum speeds of rotation can be achieved with the delta connection. Preferably, the switchover is appropriately performed automatically by the control circuit, e.g. as a function of the instantaneous speed of vehicle travel. For example, the motor can be operated in a star connection at a lower speed of travel, and in a delta connection at a higher speed of travel.

The switchover of the switching system preferably occurs during operation of the vehicle, and as a rule preferably during an acceleration phase. Since the switches of the switching system are also carrying the driver currents during traction operation, the switches should preferably be designed so that they are appropriate to the power levels which have to be switched, i.e. for voltages on the order of magnitude of 1,000 V and currents on the order of magnitude of 100 A, using conventional technology. Such switches would be expensive and bulky, which would run contrary to the stated requirement for small drive units. The present invention proceeds on the assumption that with the electronic semiconductor valves of the converters, components are already available which can switch the required electric power. The control circuit provided in the context of the invention guarantees that the semiconductor valves of the converters deactivate the driver currents while the switches also controlled by the control circuit switch the phase windings, for example, during the switchover between the star connection and the delta connection. In this manner, the switches can be designed so that they are smaller and more lightweight, since they need only be sized for stationary flowing currents, and their contacts are not exposed to any arcing wear or similar phenomena.

Theoretically, to reduce the contact load, it is sufficient if the current and/or voltage amplitude at the outputs of the converters is reduced for the duration of the switchover process, so that the driver power or current is reduced only for the duration of the switchover. But it has been determined that the period of time during which the switchover process reduces the traction of the electric motor can be kept so short (e.g. 20 to 30 msec), that the interruption of traction is not noticeable in the operation of the vehicle. Therefore the driver currents can be appropriately deactivated completely for the duration of the switching of the switches.

The actuator system not only tends to require a specified period of time to switch the switches, but it also tends to require a setup time or lead time, on account of the spring excursions in the switch contacts and the inertia of the switch contacts. The duration of the interruption of traction can be reduced if the control circuit delays the deactivation of the driver currents by the converter system in relation to the activation of the actuator system. That makes it possible for the actuator system to compensate for idle motions, spring excursions etc., before the driver currents are actually deactivated.

In one preferred embodiment of the present invention, the switching system connected to the phase windings of the electric motor and the actuator system intended for the activation of the switching system are mounted directly on the electric motor. In this manner, the number of connecting lines to which the motor module must be connected can be reduced. Such connecting lines can generally require detachable connections, and therefore increase the complexity of manufacture, assembly and installation.

The actuator system can comprise an actuator which is common to all the switches of the switching system, and is in particular combined with all the switches into a single component. But it can also be constructed of several modular units, each of which has a separate actuator of the actuator system. In this latter version, the invention also teaches that it is appropriate to connect or combine the actuator with the modular unit into a separate unit which can be mounted on the electric motor. Both versions have the advantage that they can be installed easily.

The switches of the switching system described above each preferably have a moving contact which is driven by the actuator system, and at least one stationary contact with which the moving contact can be brought into contact. To form transfer switches, pairs of stationary contacts with which the moving contact can be placed in contact in alternation can also be provided. The stationary contacts can be components of the units combined with the actuators described above. But since, under some circumstances, this can require additional detachable connections between the stationary contacts and the phase windings of the motor, the invention teaches that in one preferred embodiment, the stationary contacts of each switch are mounted directly on the electric motor, so that the switch units comprise only the moving contacts, and in addition to the actuator, they may also include a connection element for a detachable connection to the output terminal connections of the converter system.

The actuators provided for the actuation of the individual switches or of all the switches can have different designs, and can be selected primarily as a function of the available space and the required actuation speed. For example, the actuators can have an output mechanism which rotates, but in particular one which pivots in an oscillating fashion, and on which the moving contact is mounted. Alternatively, the actuator can have an output mechanism which is connected to the moving contact and which executes a linear actuation motion. The latter variant in particular is very easy to construct with simple and reliable means, e.g. in the form of a toothed rack which forms the output mechanism and is engaged with a pinion which is driven in rotation. An electric motor or an electromagnet with a rotating armature, for example, is particularly appropriate for driving such a pinion.

To guarantee reliable operation, the contacts in the closed position of the switch should preferably be held in contact with one another under a predetermined minimum force. The application forces can be generated by suitable spring systems, and instead or in addition to the springs, can be generated by the actuators, which in this case are permanently excited by the control circuit. If there are spring means to generate the application forces, the actuator for the reaction forces exerted by the switch is preferably designed to be irreversible, or self-locking. When the actuator is designed as an electric motor, it can be realized in a simple manner by an irreversible transmission, e.g. in the form of a worm gear transmission. The actuator can be locked in position mechanically in the closed position of the switch, but the locking can also be accomplished by permanent excitation of the actuator. Hydraulic or pneumatic actuators can be locked in position by sealing their pressure medium work chambers. A variant in which the contact application forces are applied by spring means, but which still makes do without a actuator which absorbs the reaction forces, takes advantage of the bidirectional top dead center characteristics of a bistable spring which, starting from an unstable middle position, generates spring forces toward both directions of movement. Bistable springs of this type can be used both for on-off switches and for transfer switches.

In addition to electric motors and electromagnets as auxiliary power sources, cylinder-piston units which are actuated by fluid overpressure or underpressure can also be provided. Both pneumatic and hydraulic units are suitable.

The control circuit can control the actuator system in an open-loop control circuit. To prevent inadvertent wrong operation and any short circuits which may result from such wrong operation, the invention teaches that in one preferred embodiment, corresponding to the output mechanism there is a displacement sensor which detects the position of the output mechanism, and the control sensor responds to the displacement sensor. The displacement sensor can be designed as a simple limit switch, but it can also be a displacement sensor which determines distance coordinates, and which then makes it possible for the control circuit to regulate the position of the output mechanism.

The mechanical switches can be appropriately utilized as safety switches, in addition to the electronic solenoid valves of the converter system, so that in the event of possible defects or malfunctions of the electronic system, they can cut the power supply to the drive motor. If the switches are designed as transfer switches, it is therefore appropriate to provide measures whereby they can be switched by means of the control circuit into a neutral position in which no contact is closed. The neutral position can be defined by a mechanical stop or a similar arrangement. But a position regulation action of the type described above can also be used to define the middle position.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained below in greater detail with reference to the embodiments illustrated in the accompanying figures.

FIG. 4 is a schematic view in cross section of a switch which can be actuated by an electric motor, as it can be used in the electric motor propulsion systems illustrated in FIGS. 1 to 3;

FIG. 5 is a schematic overhead view of the transfer switch illustrated in FIG. 4;

FIG. 6 is a variant of the transfer switch illustrated in FIG. 4 which can be actuated by en electric motor;

FIG. 7 is a schematic overhead view of the transfer switch illustrated in FIG. 6;

FIG. 8 shows an additional variant of a transfer switch which can be used in the electric motor propulsion systems illustrated in FIGS. 1 and 2, and is driven by an electromagnet, and FIG. 9 shows yet another variant of an transfer switch which can be used in the electric motor propulsion systems illustrated in FIGS. 1 to 3, and which is driven by a pneumatic or hydraulic piston-cylinder unit.

DESCRIPTION OF THE PREFERRED EMBODIMENTS

Figure 1:
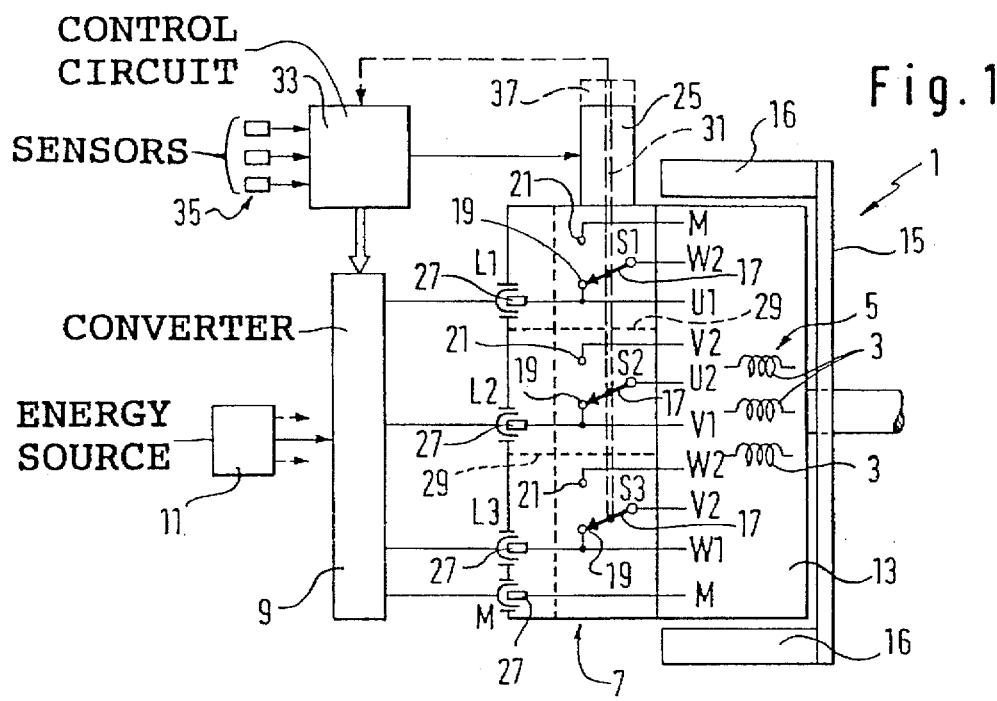
FIG. 1 is a block diagram of an electric motor propulsion system for an automotive vehicle.

The electric motor propulsion system illustrated by means of the block diagram in FIG. 1 for an automotive vehicle can comprise an electric motor 1, the multi-phase winding 5 of which, here composed of three phase windings 3, is preferably connected by means of a switching system 7 to a converter 9. The converter 9 is preferably connected to an energy source 11 on board the vehicle, e.g. a rechargeable battery or a generator driven by an internal combustion engine, and at its output terminal connections L1, L2 and L3, which are preferably phase-shifted from one another by 120 degrees, it generates pulsed driver currents for the excitation of the phase windings 3 of the electric motor 1. The driver currents generated by the converter 9 can be alternating currents or pulse-shaped direct currents. The energy source 11 can supply direct currents or alternating currents, which are preferably converted by semiconductor valves of the converter 9 into the pulsed driver currents with changeable pulsation frequency, and preferably also with changeable amplitude. A vehicle control system not shown in any greater detail, and which can be influenced by means of an accelerator pedal which is operated by the driver of the vehicle, for example, can preferably determine the frequency and amplitude of the driver currents.

Although it is possible to drive several wheels of a drive axle of the vehicle, possibly by means of a differential transmission or a similar system, using only a single electric motor, preference is given to the use of separate electric motors for the individual wheels of the vehicle. For their part, these electric motors are preferably fed by a common converter or separate converters which correspond to the individual electric motors by means of likewise separate switching systems. The electric motor can be a conventional rotary field motor, which can also have separate exciter windings in addition to the rotary field winding. But it is particularly appropriate, as illustrated in FIG. 1, to use a permanent magnet external-rotor motor with a stator 13 carrying the rotary field winding 5 and a rotor 15, e.g. a pot-shaped rotor, which on its circumference surrounding the stator 13 has a number of permanent magnets 16 located next to one another with alternating polarity. The permanent magnets 16 preferably lie opposite radially opposite poles of the rotary field winding 5 which are not illustrated in any further detail. Such an electric motor has a comparatively high output with small dimensions, and conventionally has at least approximately the shape of a flat circular cylinder.

To optimize the efficiency of the electric motor 1, the rotary field winding 5 can be switched by means of the switching system 7 between a star (or "wye") connection and a delta connection. As a result of the operation of one and the same electric motor 1, alternately in a star connection and in a delta connection, the electric motor 1 can be more efficiently adjusted to meet the demands of the current operating conditions. When operated in the star connection, the electric motor can generally achieve a higher torque, but the higher torque essentially comes at the expense of a reduction in the maximum speed which can be reached. On the other hand, when the motor is operated in the delta connection, it can reach a higher maximum speed, but at the expense of reduced torque. The transfer switch of the switching system can operate as a function of the vehicle speed for example, so that the electric motor 1 is operated in the star connection up to a specified vehicle speed, and in the delta connection above that speed. Other control strategies, which result in the switchover of the switching system 7 as a function of the torque, are also conceivable.

Figure 2:
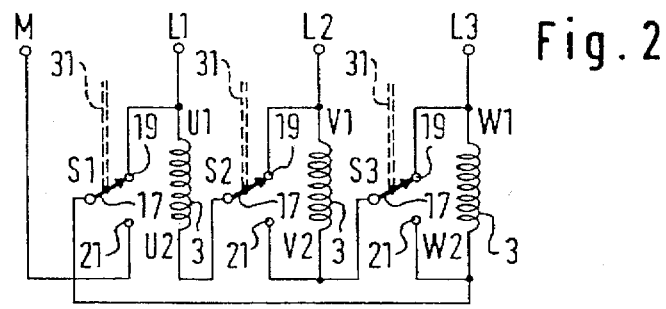
FIG. 2 is a diagram showing a switching system which switches the rotary field winding of an electric motor of the propulsion system illustrated in FIG. 1 between the star connection and the delta connection.

FIG. 2 shows details of the schematic diagram of the switching system 7. L1, L2 and L3 designate respectively the output terminal connections, and thus the phases, of the converter 9. M designates a connection of the converter 9 which is connected to frame (i.e. possibly earth or ground) potential for the connection to a neutral point of the rotary field winding which is formed in the star connection. The winding terminal connections of the phase winding 3 connected to the output terminal connection L1 are designated U1 and U2. The phase winding connected to the output terminal connection L2 has the winding terminal connections V1 and V2, while the phase winding connected to the output terminal connection L3 has the winding terminal connections W1 and W2. In the illustrated embodiment, the switching system 7 has three mechanical transfer switches S1, S2 and S3, each of which has one moving contact 17 and two stationary contacts 19, 21. The moving contacts 17 of each of the three switches S1, S2 and S3 are preferably connected in cyclic interchange with each one of the winding terminal connections, in this case the winding terminal connections W2, U2 and V2. The stationary contacts corresponding to the moving contacts 17 of the individual switches S1, S2 and S3 are preferably connected to respective other phase windings 3, and namely to their winding terminal connections U1, V1 and W1 not connected to the moving contacts 17.

The stationary contacts 21 of two of the switches, in this case the switches S2 and S3, are preferably connected together with the stationary connections 19 of these switches to each of the phase windings 3, and namely to the winding terminal connection V2 or W2 not connected to the stationary contact 19. The stationary contact 21 of the remaining switch, in this case of the switch S1, is preferably connected to the frame potential M. FIG. 2 shows the moving contacts 17 in the delta connection, in which they are in contact with the stationary contacts 19 which are connected to the winding terminal connections U1, V1 and W1 and to the output connections L1, L2 and L3. When the moving contacts 17 in contact with the stationary contacts 21 are switched, the phase windings 3 in the star connection are connected to the output terminal connections L1, L2 and L3 and the frame potential M is simultaneously connected to the neutral point of this star connection.

In the embodiment illustrated in FIG. 1, the switches S1, S2 and S3 of the switching system 7, including an actuator 25 which drives the moving contacts 17, are preferably attached to the stator 13 of the electric motor 1, and therefore essentially form a single unit with the electric motor 1. The connection elements 27, e.g. plug contacts or terminal screws for the detachable connection with the output terminal connections L1, L2 and L3 of the converter 9, are also a component of this unit. The switches S1, S2 and S3 can all be combined into one unit. But the unit of the switching system 7, as shown at 29 in FIG. 1, can also be composed of several switch modules. Regardless of the design and construction of the switching system 7, however, the actuator 25 is preferably common to all the switches S1, S2 and S3, and is preferably connected by means of suitable force transmission means, indicated at 31 in FIG. 1, to the moving contacts 17 of the switches S1, S2 and S3. The force transmission means 31 can be rods, cams, flexible cables or similar devices.

The actuator 25 is preferably controlled by a control circuit 33 which can be a component of the above-mentioned vehicle control system. The control system 33 preferably responds to sensors 35 which, for their part, measure the parameters which describe the condition of the vehicle. For example, the sensors 35 can supply information which represents the actual or requested torque, or the vehicle speed or similar characteristics. The control circuit 33 switches the actuator 25, as a function of this information, as explained above, to the delta connection position or to the star connection position of the switching system 7.

But the control circuit 33 also includes the converter 9. Simultaneously with the control signal which effects the switchover of the actuator 25, the control circuit 33 transmits an additional control signal to the converter 9, which signal deactivates all the driver currents to the output connections L1, L2 and L3 for the duration of the control signal fed to the actuator 25, and thus for the duration of the switchover process, during which the moving contacts 17 are moved between the stationary contacts. The electrical semiconductor valves which are already present in the converter 9 are preferably used for the deactivation of the driver currents. The mechanical contacts of the switching system 7 therefore need only be designed for the stationary current load of the driver currents. In particular, the contacts of the switching system 7 need only be sized for significantly lower contact wear.

There can be some idle motion in the actuation displacement of the actuator 25 toward the moving contacts, and the actuator 25 can be subjected to certain inertia effects which delay the beginning of the actual movement of the moving contacts 17 with respect to the initiation of the control signal by the control circuit 33 which controls the actuator 25. The control circuit 33 preferably comprises delaying means which accordingly delay the control signal which is transmitted to the converter and deactivates the driver currents with respect to the control signal transmitted to the actuator 25. Although the interruption of the traction of the electric motor 1 caused by the switchover of the switching system 7 is comparatively brief and is thus negligible, in this manner the duration of the interruption of traction can be reduced even further.

As shown at 37, there can be a position sensor which corresponds to the actuator 25, and the task of which is to detect the current position of the output mechanism 31. The sensor 37 preferably supplies the control circuit 33 with feedback signals which make it possible to monitor the current setting of the switching system 7. The sensor 37 can be a simple limit switch, but the sensor can also be designed as a continuously operating displacement sensor, one which can supply current position signals as part of a position regulating loop of the control circuit 33.

The switches S1, S2 and S3 of the switching system 7 can also preferably be set by means of the control circuit 33, possibly using the signal supplied by the sensor 37, to a middle position, in which the moving contact 17 does not contact any of the stationary contacts 19, 21. In the middle position, the electric motor 1 is essentially completely separated from the output terminal connections L1, L2 and L3 and from the connection M. The switching system 7 can thus be used as a mechanical disconnector, in addition to the electrical semiconductor valves of the converter 9 as safety switches, which make it possible to disconnect the electric motor 1 completely from the converter 9, e.g. in the event of a defect or malfunction of the converter 9.

Figure 3:
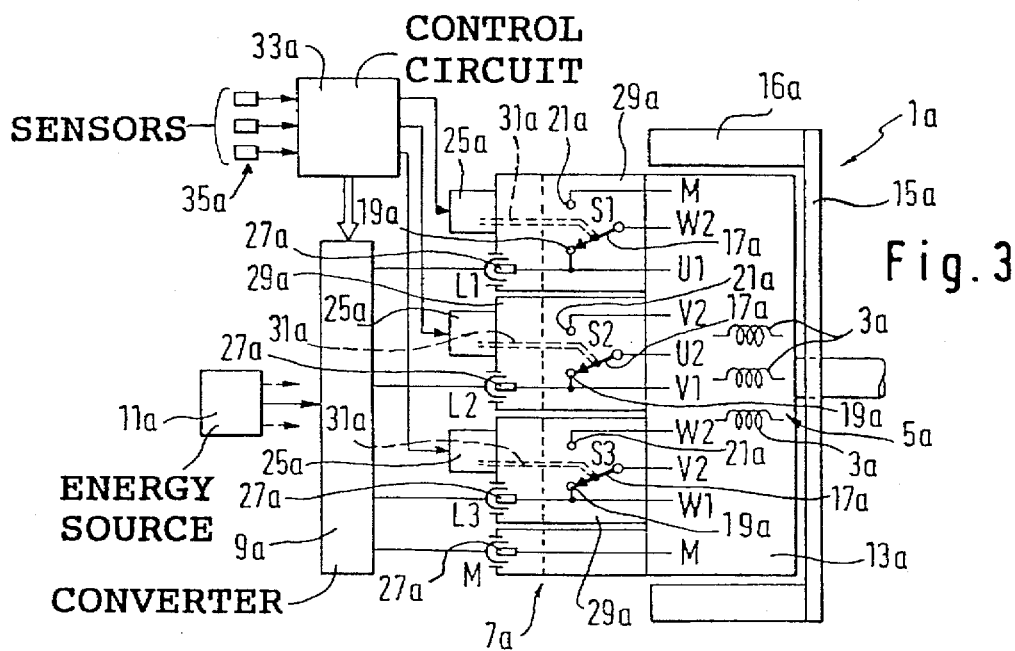
FIG. 3 is a block diagram of a variant of the electric motor propulsion system illustrated in FIG. 1.

FIG. 3 illustrates a variant of the electric motor propulsion system illustrated in FIG. 1, which also makes possible a switchover from star to delta connections as illustrated in FIG. 2. Components which are functionally equivalent are identified by the same reference numbers used in FIGS. 1 and 2, and are further identified by the letter "a" for clarity. Reference is also made to the description of FIGS. 1 and 2 to explain the construction and function of the system.

While in the propulsion system illustrated in FIG. 1, all the switches of the switching system correspond to a common actuator, in the embodiment illustrated in FIG. 3, the switches S1, S2 and S3 are designed as module 29a, each of which comprises a separate actuator. Accordingly, the moving contacts 17a of these switches are connected to the actuator 25a by means of separate force transmission means 31a. The modules 29a, including the corresponding actuators 25a, are preferably assembled together with detachable connection elements 27a into a single unit, and are located on the stator 13a of the electric motor 1a. Although not shown in FIG. 3, each of the actuators 25a can comprise a position sensor, like the one shown at 37 on the propulsion system illustrated in FIG. 1.

Embodiments of actuators are explained below, as they can be used to advantage in the vehicle propulsion systems described above and illustrated in FIGS. 1 to 3. In the actuators explained below, functionally equivalent components are identified with the same reference numbers, and a letter is added to the number for clarity. The explanation also refers to the preceding explanation of these components.

FIGS. 4 and 5 illustrate a switch module 29b which is attached to a base part 39 of the stator of the electric motor. The stationary contacts 19b, 21b of the module 29b are mounted directly on the base part 39 by means of insulating mounts 41, while the moving contact 17b is provided on a resilient contact arm 43 which projects radially in relation to the axis of rotation of an output shaft 45 of the actuator 25b from the output shaft 45. The actuator 25b comprises a small electric motor 47 with a downstream transmission 49 which drives the output shaft 45 and which can pivot or rotate around the axis of the output shaft 45. The connection terminal element 27b for the detachable connection of the converter is attached to a housing 51 which encloses the actuator 25b and the contacts 17b, 19b and 21b so that it accessible from outside. For the connection of the moving contact 17b to the phase windings of the electric motor, an additional terminal connection element 53 is attached with insulation in the base part 39, which additional connection element is connected to the contact 17b by means of a flexible lead 55 or similar device so that it is electrically conductive, but still movable.

The actuator 25b provides sufficient application forces in the closed positions of the switch, in which the moving contact 17b is alternately in contact with one of the stationary contacts 19b or 21b. For this purpose, the electric motor 47 is either continuously excited by means of the control circuit (33 in FIG. 1) which controls it, or the transmission 49 is designed as an irreversible transmission in relation to the reaction forces of the output shaft 45, so that the spring forces of the spring element 54 press the contacts against one another without any reverse rotation of the output shaft 45.

FIGS. 4 and 5 illustrate a module of the type explained with reference to FIG. 3. It is apparent that the output shaft 45 can be extended to activate several switches, so that the actuator 25b can also be used for the version of the vehicle propulsion system illustrated in FIG. 1.

FIGS. 6 and 7 illustrate a variant of a switch module 29c which differs from the version illustrated in FIGS. 4 and 5 primarily in that the actuator 25c, instead of an output shaft driven in rotational motion, drives the moving switch contact 17c by means of an output rod 53 which moves in a linear fashion. The output rod 53 in turn preferably bears the moving contact 17c on a resilient arm 43c, while the stationary contacts 19c, 21c are mounted by means of insulator elements 41c directly on the base part 39c of the stator of the electric motor. The actuator 25c is preferably designed as an electric motor propulsion unit, and comprises, for example, an electric motor or an electromagnet with a rotating armature which drives a pinion 57 engaged with the teeth 55 of the output rod 53. Stable limit positions of the output rod 53 can be guaranteed by a bistable spring 59, which preferably snaps out of a middle, unstable position resiliently in both directions into stable limit positions. In the stable limit positions, one of which is illustrated in FIG. 7, the resilient arm 43c which supports the moving contact 17c and projects from the output rod 53 provides defined contact application pressures. It goes without saying that the application forces which create a rigid contact between the contact 17c and the output rod 53 can also generate elastic application forces. Since the stable limit position of the output rod 53 is essentially guaranteed by the bistable spring 59, there is essentially no need for a limit position looking by the electric motor propulsion system of the actuator 25c. Instead of the bistable spring 59, however, a position locking can also be achieved by the electric motor propulsion system, as illustrated and explained with reference to FIGS. 4 and 5. There can also be bistable position locks of the type explained with reference to the version illustrated in FIGS. 4 and 5. In the version illustrated in FIGS. 6 and 7, the actuator 25c can also be common to several switches and/or modules, e.g. so that the output rod 53 carries several moving contacts 17c.

FIG. 8 illustrates an additional variant in which, in contrast to the variant illustrated in FIGS. 6 and 7, there is an electromagnet 61 for the actuation of the output rod 53d which bears the moving contact 17d. The electromagnet 61 of this actuator 25d has an armature 63 mounted on the output rod 53d, which armature 63 presses a moving contact 17d mounted on an arm 43d of the actuator rod 53d and acted upon by a return spring 65 in one of the stationary contacts, in this case the contact 21d, in opposition to the force of the return spring 65, against the other contact 19d, as long as the electromagnet 61 is excited.

An additional variant of a actuator 25e is illustrated in FIG. 9, which differs from the actuator illustrated in FIG. 8 essentially only in that, instead of the electromagnet-armature unit, there is a piston-cylinder unit with a stationary pressure cylinder 67 and a piston 69 connected to the output rod 53e and which can be displaced in the pressure cylinder 67. The unit can be actuated pneumatically or hydraulically, if fluid at an overpressure is introduced at 71. With a suitable arrangement of the pressure chamber, the unit can also be used for systems which operate on underpressure. The system illustrated in FIG. 9 has been designed so that the moving contact 17e is biased by the return spring 65e in one of the limit positions. When double-acting cylinders are used, the return spring 65e can be eliminated. The output rod 53e can be stopped in the limit positions by closing the pressurized pressure chamber.

One feature of the invention resides broadly in the electric motor propulsion system for a motor vehicle, comprising at least one electric motor 1 with a rotary field winding 5 divided into several phase windings 3, an electronic converter system 9 which supplies pulsating driver currents of different phase to several output terminal connections L1, L2, L3, a system 7 of mechanical switches S1, S2, S3 which connects the phase windings 3 of the electric motor 1 to the output terminal connections L1, L2, L3, and by means of which the number of the phase windings 3 connected to each of the output terminal connections L1, L2, L3 can be changed, an actuator system 25 for the actuation of the switches S1, S2, S3, and a control circuit 33 which controls the actuator system 25, characterized by the fact that the control circuit 33 also controls the converter system 9 and reduces the amplitude of the driver currents supplied to the output terminal connections L1, L2, L3, while the control circuit 33 changes the position of the switches S1, S2, S3 by controlling the actuator system 25.

Another feature of the invention resides broadly in the propulsion system characterized by the fact that the control circuit 33 essentially completely deactivates the driver currents supplied to the output terminal connections L1, L2, L3 during the change of the position of the switches S1, S2, S3.

Yet another feature of the invention resides broadly in the propulsion system characterized by the fact that the control circuit 33 delays the deactivation of the driver currents in relation to the activation of the actuator system 25.

Still another feature of the invention resides broadly in the propulsion system characterized by the fact that the switching system 7 connected to the phase windings 3 of the electric motor 1 and the actuator system 25 designed for the actuation of the switching system 7 are mounted on the electric motor 1.

A further feature of the invention resides broadly in the propulsion system characterized by the fact that the actuator system comprises a actuator 25 which is common to all the switches S1, S2, S3 of the switching system, and in particular is combined with all the switches S1, S2, S3 into a unit.

Another feature of the invention resides broadly in the propulsion system characterized by the fact that the switching system comprises several modular units 29a, each of which has a separate actuator 25a of the actuator system, in particular actuators 25a which are connected to each of the modular units 29a to form a separate unit which is mounted on the electric motor.

Yet another feature of the invention resides broadly in the propulsion system characterized by the fact that each switch S1, S2, S3 has a moving contact 17 which is driven by the actuator system 25, and at least one stationary contact 19, 21 with which the moving contact 17 can be placed in contact, in particular two stationary contacts 19, 21 which can be alternately contacted by the moving contact 17, and that at least one of the stationary contacts 19, 21 of each switch S1, S2, S3, in particular both stationary contacts 19, 21, are mounted directly on the electric motor.

Still another feature of the invention resides broadly in the propulsion system characterized by the fact that the switches S1, S2, S3, together with the actuator system 25 designed to actuate them, and with terminal connecting elements 27 for a detachable connection to the output terminal connections L1, L2, L3 of the converter system 9, are combined into at least one unit which is mounted on the electric motor 1.

A further feature of the invention resides broadly in the propulsion system characterized by the fact that the actuator system has at least one actuator 25b with an output mechanism 45 which rotates around an axis of rotation, and in particular pivots in an oscillating fashion, for the actuation of at least one of the switches.

Another feature of the invention resides broadly in the propulsion system characterized by the fact that the actuator system has at least one actuator 25c–e with an output mechanism 53; 53d, e which executes a linear actuation movement for the actuation of at least one of the switches.

Yet another feature of the invention resides broadly in the propulsion system characterized by the fact that the output mechanism 53 is designed as a toothed rack which is engaged with a pinion 57 which is driven in rotation.

Still another feature of the invention resides broadly in the propulsion system characterized by the fact that for the actuation of the switches, the actuator system has at least one irreversible actuator for reaction forces exerted by the switch.

A further feature of the invention resides broadly in the propulsion system characterized by the fact that the actuator system for the actuation of the switches has at least one actuator which can be locked at least in its limit position which closes the switches.

Another feature of the invention resides broadly in the propulsion system characterized by the fact that the control circuit 33 for the generation of the locking in position keeps the actuator actuated in the limit position.

Yet another feature of the invention resides broadly in the propulsion system characterized by the fact that the actuator system for the actuation of the switches S1, S2, S3 has at least one actuator 25b, c, the output mechanism 45; 53 of which interacts, at least in this limit position closing the switches S1, S2, S3, with a spring element 43; 59 which applies pressure to the output mechanism 45; 53 and/or to the switch to place it in the closed position.

Still another feature of the invention resides broadly in the propulsion system characterized by the fact that the spring element is designed as a bistable spring 59.

A further feature of the invention resides broadly in the propulsion system characterized by the fact that the switch S1, S2, S3 is designed as a transfer switch, and the actuator 25c propels the output mechanism 53 in both limit positions of the switch.

Another feature of the invention resides broadly in the propulsion system characterized by the fact that the actuator system 25b for the actuation of the switches S1, S2, S3 has at least one electric motor 47, in particular a geared motor 47; 49, and preferably an irreversible or self-locking geared motor.

Yet another feature of the invention resides broadly in the propulsion system characterized by the fact that the actuator system 25a for the actuation of the switches S1, S2, S3 has at least one electromagnet 61, 63.

Still another feature of the invention resides broadly in the propulsion system characterized by the fact that the actuator system 25e for the actuation of the switches S1, S2, S3 has at least one cylinder-piston unit 67, 69 which can be actuated by fluid at an overpressure or an underpressure.

A further feature of the invention resides broadly in the propulsion system characterized by the fact that the actuator system for the actuation of the switches S1, S2, S3 has at least one actuator 25, the output mechanism 31 of which corresponds to the displacement sensor 37 which detects the position of the output mechanism 31, and that the control circuit 33 responds to the displacement sensor 37.

Another feature of the invention resides broadly in the propulsion system characterized by the fact that at least some of the switches S1, S2, S3 are designed as transfer switches, and can be switched by means of the control circuit 33 into a neutral position in which none of the contacts are closed.

Yet another feature of the invention resides broadly in the propulsion system characterized by the fact that the electric motor 1 has a three-phase rotary field winding 5, and the switching system 7 is designed as a star-delta switching system.

Examples of flexplate components, which may be utilized in accordance with the embodiments of the present invention, may be found in the following U.S. Pat. Nos.: No. 5,323,665, which issued to Rediker on Jun. 28, 1994; No. 5,184,524, which issued to Senia on Feb. 9, 1993; No. 5,121,821, which issued to Poorman et al. on Jun. 16, 1992; and No. 4,672,867, which issued to Rodriguez on Jun. 16, 1987.

Examples of hybrid drive arrangements, such as internal combustion engine-electric generator arrangements, and components associated therewith, such as control arrangements and individual motors for driving corresponding wheels, may be found in the following U.S. Pat. Nos.: No. 5,327,987, which issued to Abdelmalek on Jul. 12, 1994; No. 5,318,142, which issued to Bates et al. on Jun. 7, 1994; No. 5,301,764, which issued to Gardner on Apr. 12, 1994; No. 5,249,637, which issued to Heidl et al. on Oct. 5, 1993; No. 5,176,213, which issued to Kawai et al. on Jan. 5, 1993; No. 5,327,992, which issued to Boll on Jul. 12, 1994; No. 5,291,960, which issued to Brandenburg et al. on Mar. 8, 1994; and No. 5,264,764, which issued to Kuang on Nov. 23, 1993.

Examples of electric and hybrid vehicles, and related components, may be or are disclosed in the following U.S. Pat. Nos.: No. 5,251,721 entitled "Semi-hybrid Electric Automobile" to Ortenheim; No. 5,004,061 entitled "Electrically Powered Motor Vehicle" to Andruet; No. 5,289,100 entitled "System for Powering, Speed Control, Steering, and Braking" to Joseph; No. 5,265,486 entitled "Portable External Drive Assembly" to AAMCO Corporation; No. 5,289,890 entitled "Drive Unit for Electric Motor Vehicle" to Aisin; and No. 5,310,387 entitled "Differential Motor Drive" to Hughes Aircraft Company.

Additional examples of electric vehicles in which the present invention my be utilized may be or are disclosed in the following U.S. Pat. Nos.: No. 5,166,584 entitled "Electric Vehicle" to Nissan; No. 5,161,634 entitled "Electric Vehicle" to Kubota Corporation; and No. 5,150,045 entitled "Electric Automobile" to Kaisha.

Examples of coolant pumps, which may be utilized in accordance with the embodiments of the present invention, may be found in the following U.S. Pat. Nos.: No. 4,643,135, which issued to Wunsche on Feb. 17, 1987; No. 4,677,943, which issued to Skinner on Jul. 7, 1987; No. 4,827,589, which issued to Friedriches on May 9, 1989; No. 4,886,989, which issued to Britt on Dec. 12, 1989; and No. 4,728,840, which issued to Newhouse on Mar. 1, 1988.

Examples of electronic commutation devices, which may be utilized in accordance with the embodiments of the present invention, may be found in the following U.S. Pat. Nos.: No. 5,164,623 entitled "Independent-drive Wheel for a Wheel-mounted Vehicle"; No. 5,117,167 entitled "Commutating Energy Suppression Circuit for an Electronically Commutated DC Motor" to Rotron; No. 5,258,679 entitled "Structure of DC Motor with Electronic Commutation" to ECIA; and No. 5,117,167 entitled "Commutating Energy Suppression Circuit for an Electronically Commutated DC Motor" to Rotron.

Examples of kinetic seals, which may be utilized in accordance with the embodiments of the present invention, may be found in the following U.S. Pat. Nos.: No. 4,989,883 entitled "Static and Dynamic Shaft Seal Assembly" to Inpro; No. 5,088,385 entitled "Actuator Apparatus With Secondary Seal Motion" to Westinghouse; No. 5,192,085 entitled "Rubber Drive System Mechanical Seal"; No. 5,226,837 entitled "Environmentally Protected Connection" to Raychem; and No. 5,286,063 entitled "Ball and Socket Floating Seal Assembly" to Babcock & Wilcox.

Examples of Phase angle sensors, which may be utilized in accordance with the embodiments of the present invention, may be found in the following U.S. Pat. Nos.: No. 5,203,290 entitled "Intake and/or Exhaust-valve Timing Control System for Internal Combustion Engine" to Atsugi Unisia; No. 5,277,063 entitled "Single Plane Trim Balancing" to General Electric; No. 5,353,636 entitled "Device for Determining Misfiring of Cylinders in Multi-cylinder Engines" to Toyota; No. 5,068,876 entitled "Phase Shift Angle Detector" to Sharp; No. 5,097,220 entitled "Circuit for Demodulating PSK Modulated Signal by Differential-Defection to Japan Radio"; and No. 5,063,332 entitled "Feedback Control System for a High-efficiency Class-D Power Amplifier Circuit".

Examples of three-phase motors for use with electric or hybrid vehicles, which may be utilized in accordance with the embodiments of the present invention, may be found in the following U.S. Pat. Nos.: No. 5,182,508, which issued to Schauder on Jan. 26, 1993; No. 5,194,800, which issued to Conzelmann et al. on Mar. 16, 1993; No. 5,216,212, which issued to Golowash et al. on Jun. 1, 1993; No. 5,230,402, which issued to Clark. et al. on Jul. 27, 1993; and No. 5,294,853, which issued to Schluter et al. on Mar. 15, 1994.

Examples of sensors, such as speed and/or torque sensors, which may be utilized in accordance with the embodiments of the present invention, may be found in the following U.S. Pat. Nos.: No. 5,294,871, which issued to Imaseki on Mar. 15, 1994; No. 5,345,154, which issued to King on Sep. 6, 1994; No. 5,359,269,which issued to Wedeen on Oct. 25, 1994; No. 5,182,711, which issued to Takahashi et al. on Jan. 26, 1993; No. 5,245,966, which issued to Zhang et al. on Sep. 21, 1993; and No. 5,332,059, which issued to Shirakawa et al. on Mar. 15, 1994.

Examples of high-current semiconductors, which may be utilized in accordance with the embodiments of the present invention, may be found in the following U.S. Pat. Nos.: No. 5,253,613, which issued to Bailey et al. on Oct. 19, 1993; No. 5,361,022, which issued to Brown on Nov. 1, 1994; No. 5,365,116, which issued to Lohss on Nov. 15, 1994; No. 5,274,287, which issued to Bahn on Dec. 28, 1993.

Examples of other media having components which may be utilized in accordance with the embodiments of the present invention, may be found in the following U.S. Pat. Nos.: No. 5,277,063, which issued to Thomas on Jan. 11, 1994; No. 5,373,630, which issued to Lucier et al. on Dec. 20, 1994; No. 5,373,632, which issued to Lucier et al. on Dec. 20, 1994.

Examples of battery-operated electric vehicles, having components, such as batteries for providing electrical power, which may be utilized in accordance with the embodiments of the present invention, may be found in the following U.S. Pat. Nos.: No. 5,229,703, which issued to Harris on Jul. 20, 1993; No. 5,325,912, which issued to Hotta et al. on Jul. 5, 1994; No. 5,332,630, which issued to Hsu on Jul. 26, 1994; No. 5,369,540, which issued to Konrad et al. on Nov. 29, 1994; No. 5,373,910, which issued to Nixon on Dec. 20, 1994.

Examples of converter arrangements, having components which may be utilized in accordance with the embodiments of the present invention, may be found in the following U.S. Pat. Nos.: No. 5,309,073, which issued to Kaneko et al. on May 3, 1994; No. 5,321,231, which issued to Schmalzriedt on Jun. 14, 1994; No. 5,341,083, which issued to Klontz et al. on Aug. 23, 1994; No. 5,350,994, which issued to Kinoshita et al. on Sep. 27, 1994; and No. 5,368,116, which issued to Iijima et al. on Nov. 29, 1994.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 31 347.0, filed on Sep. 2, 1994, having inventor Hans Fliege, and DE-OS P 44 31 347.0 and DE-PS P 44 31 347.0, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. An electric road motor vehicle comprising:

a chassis;

a plurality of wheels being rotationally mounted on said chassis;

a plurality of road vehicle tires being disposed on corresponding ones of said plurality of wheels;

an electric motor assembly for driving said wheels to propel said electric road motor vehicle;

said electric motor assembly comprising:

an electric motor for driving at least one of said wheels of said electric road motor vehicle, said electric motor comprising a plurality of phase windings;

a plurality of switches for selectively switching said electric motor, during operation of said electric motor, between a first operating state, wherein said electric motor assumes a first set of at least one operating parameter, and a second operating state, wherein said electric motor assumes a second set of at least one operating parameter;

said plurality of switches each having:
   a first contact portion;
   a second contact portion; and
   switch portion means, said switch portion means being movable between said first and second contact portions to selectively contact either of said first and second contact portions;

converter means for providing electrical power to said plurality of switches, said converter means having means for receiving direct-current electrical power and converting said received direct-current electrical power to alternating-current electrical power to be supplied to said electric motor;

said electrical power to be supplied to said plurality of switches comprising electric currents having amplitudes;

means for controlling said switches between said first and second operating states;

said controlling means comprising means for controlling said converter means and for selectively reducing said amplitudes of at least said electric currents provided to said plurality of switches; and wherein said means for controlling said converter means comprises means for reducing, during switching of said electric motor between said first and second operating states, said amplitudes of said electric currents provided to said plurality of switches.

2. The electric road motor vehicle according to claim 1, wherein said means for reducing, during switching, the amplitude of currents comprises means for deactivating, during switching of said electric motor between said first and second operating states, said electric currents provided to said plurality of switches.

3. The electric motor vehicle according to claim 2, wherein:

said means for controlling said switches comprises means for actuating said switches, said actuating means having means for moving said movable switch portion means of said switches between said first and second contact portions of said switches; and said means for controlling said converter means having means for delaying, in relation to an actuating of said switches by said means for actuating said switches, deactivation of said electric currents provided to said plurality of switches.

4. The electric road motor vehicle according to claim 3, wherein:

said plurality of switches are respectively connected to said phase windings of said electric motor; and said switches and said actuating means are mounted on said electric motor.

5. The electric road motor vehicle according to claim 4 wherein:

each of said switch portion means comprises a movable contact being movable by said actuating means, said first and second contact portions of each of said switches respectively comprising two stationary contacts, said two stationary contacts being alternately contactable by said movable contact, both of said stationary contacts of each of said switches being mounted directly on said electric motor;

said electric motor assembly further comprising terminal connecting elements;

said converter means comprising output terminal connections;

said electric motor assembly further comprising means for connecting said terminal connecting elements and said output terminal connections with one another;

said connecting means comprising means for detaching said terminal connecting elements and said output terminal connections from one another; and said terminal connecting elements being disposed, along with said switches and said at least one actuator, in said at least one motor-mounted switching unit.

6. The electric road motor vehicle according to claim 5, wherein:

said at least one actuator comprises:

an output mechanism, said output mechanism comprising means for moving at least one of said movable contacts;

means for providing an actuation force to propel said output mechanism and said at least one of said movable contacts;

said output mechanism being rotatable about a corresponding axis of rotation; and said means for providing an actuation force comprising means for pivoting at least a portion of said output mechanism in an oscillating fashion, to move said at least one of said movable contacts and actuate at least one of said switches.

7. The electric road motor vehicle according to claim 6, further comprising:

at least one motor-mounted switching unit;

said actuating means being disposed in said at least one motor-mounted switching unit; and said actuating means comprising a single actuator for commonly actuating all of said switches, said at least one motor-mounted switching unit comprising a single motor-mounted switching unit, said single actuator and said switches being disposed in said single motor-mounted switching unit.

8. The electric road motor vehicle according to claim 6, further comprising:

at least one motor-mounted switching unit;

said actuating means being disposed in said at least one motor-mounted switching unit; and said at least one motor-mounted switching unit comprising a plurality of modular units, said actuating means comprising a plurality of actuators, each of said plurality of actuators being disposed in a corresponding one of said modular units, each of said plurality of actuators being connected to a single corresponding one of said switches, said modular units being separate units mounted on said electric motor.

9. The electric road motor vehicle according to claim 6, wherein:

said means for controlling said switches comprises means for ensuring continued closure of said at least one switch upon closing of said at least one switch by said output mechanism;

said means for ensuring continued closure of said at least one switch comprising irreversible actuator means for rendering said output mechanism irreversible with respect to reaction forces exerted by said at least one switch.

10. The electric road motor vehicle according to claim 9 wherein:

said means for pivoting said output mechanism comprising an irreversible geared electric motor;

said means for rendering said output mechanism irreversible comprising said irreversible geared electric motor;

said actuating means further comprises a displacement sensor, said displacement sensor having means for detecting a position of said output mechanism, said controlling means being responsive to said displacement sensor;

at least some of said switches comprise a transfer switch being switchable, by means of said controlling means, into a neutral position, in which neither of said contacts are closed; and said plurality of phase windings comprising a three-phase rotary field winding, whereby said switches constitute a star-delta switching system.

11. The electric road motor vehicle according to claim 6, wherein:

said means for controlling said switches comprises means for ensuring continued closure of said at least one switch upon closing of said at least one switch by said output mechanism; and said means for ensuring continued closure of said at least one switch comprises:

means for controlling said means for providing an actuation force to lock said output mechanism at least in at least one limit position corresponding to the closing of said at least one of said switches, and for keeping said output mechanism locked in said at least one limit position.

12. The electric road motor vehicle according to claim 6, wherein:

said means for controlling said switches comprises means for ensuring continued closure of said at least one switch upon closing of said at least one switch by said output mechanism;

said means for ensuring continued closure of said at least one switch comprises:

a spring element for interacting with said output mechanism, at least in at least one limit position corresponding to closing of said at least one switch, said spring element comprising means for biasing at least one of:

said output mechanism; and at least a portion of said at least one switch.

13. The electric road motor vehicle according to claim 5, wherein:

said at least one actuator comprises:

an output mechanism, said output mechanism comprising means for moving at least one of said movable contacts;

means for providing an actuation force to propel said output mechanism and said at least one of said movable contacts;

said output mechanism comprising means for executing a linear movement to move said at least one of said movable contacts; and said means for providing an actuation force comprising means for linearly displacing said means for executing a linear movement, to move said at least one of said movable contacts and actuate at least one of said switches.

14. The electric road motor vehicle according to claim 13 wherein:

said means for providing an actuation force comprises at least one electromagnet configured for linearly displacing said means for executing a linear movement;

said actuating means further comprises a displacement sensor, said displacement sensor having means for detecting the position of said output mechanism, said controlling means being responsive to said displacement sensor;

at least some of said switches comprise a transfer switch being switchable, by means of said controlling means, into a neutral position, in which neither of said contacts are closed; and said plurality of phase windings comprising a three-phase rotary field winding, whereby said switches constitute a star-delta switching system.

15. The electric road motor vehicle according to claim 13, wherein:

said means for providing an actuation force comprises at least one cylinder-piston unit being actuable by fluid at an overpressure or underpressure, said at least one piston-cylinder unit being configured for linearly displacing said means for executing a linear movement;

said actuating means further comprises a displacement sensor, said displacement sensor having means for detecting the position of said output mechanism, said controlling means being responsive to said displacement sensor;

at least some of said switches comprise a transfer switch being switchable, by means of said controlling means, into a neutral position, in which neither of said contacts are closed; and said plurality of phase windings comprising a three-phase rotary field winding, whereby said switches constitute a star-delta switching system.

16. The electric road motor vehicle according to claim 13, wherein:

said means for executing a linear movement comprises a toothed rack; and said output mechanism further comprises a pinion being engaged with said toothed rack, said pinion being rotatingly drivable by said means for providing an actuation force, to linearly displace said toothed rack.

17. The electric road motor vehicle according to claim 16 wherein:

said means for controlling said switches comprises means for ensuring continued closure of said at least one switch upon closing of said at least one switch by said output mechanism;

said means for ensuring continued closure of said at least one switch comprising irreversible actuator means for rendering said output mechanism irreversible with respect to reaction forces exerted by said at least one switch.

18. The electric road motor vehicle according to claim 16 wherein:

said means for controlling said switches comprises means for ensuring continued closure of said at least one switch upon closing of said at least one switch by said output mechanism;

said means for ensuring continued closure of said at least one switch comprises:
means for controlling said means for providing an actuation force to lock said output mechanism at least in at least one limit position corresponding to the closing of said at least one of said switches, and for keeping said output mechanism locked in said at least one limit position.

19. The electric road motor vehicle according to claim 16 wherein:

said means for controlling said switches comprises means for ensuring continued closure of said at least one switch upon closing of said at least one switch by said output mechanism;

said means for ensuring continued closure of said at least one switch comprises:
a spring element for interacting with said output mechanism, at least in at least one limit position corresponding to closing of said at least one switch, said spring element comprising means for biasing at least one of:
said output mechanism; and
at least a portion of said at least one switch.

20. The electric road motor vehicle according to claim 19, wherein:

each of said switches is designed as a transfer switch, said transfer switches being switchable, by means of said controlling means, into a neutral position, in which neither of said contacts are closed;

said at least one limit position comprises two limit positions, corresponding to closing of said at least one switches at each of said two stationary contacts of each of said at least one switch;

said spring element comprising a bistable spring;

said output mechanism being propelled by said bistable spring in both of said two limit positions;

said actuating means comprises a displacement sensor, said displacement sensor having means for detecting the position of said output mechanism, said controlling means being responsive to said displacement sensor; and said plurality of phase windings comprising a three-phase rotary field winding, whereby said switches constitute a star-delta switching system.

21. The electric road motor vehicle according to claim 13, wherein:

said means for controlling said switches comprises means for ensuring continued closure of said at least one switch upon closing of said at least one switch by said output mechanism; and said means for ensuring continued closure of said at least one switch comprising irreversible actuator means for rendering said output mechanism irreversible with respect to reaction forces exerted by said at least one switch.

22. The electric road motor vehicle according to claim 13, wherein:

said means for controlling said switches comprises means for ensuring continued closure of said at least one switch upon closing of said at least one switch by said output mechanism;

said means for ensuring continued closure of said at least one switch comprises:
means for controlling said means for providing an actuation force to lock said output mechanism at least in at least one limit position corresponding to the closing of said at least one of said switches, and for keeping said output mechanism locked in said at least one limit position.

23. The electric road motor vehicle according to claim 13, wherein:

said means for controlling said switches comprises means for ensuring continued closure of said at least one switch upon closing of said at least one switch by said output mechanism;

said means for ensuring continued closure of said at least one switch comprises:
a spring element for interacting with said output mechanism, at least in at least one limit position corresponding to closing of said at least one switch, said spring element comprising means for biasing at least one of:
said output mechanism; and
at least a portion of said at least one switch.

* * * * *

UNITED STATES PATENT AND TRADEMARK OFFICE
CERTIFICATE OF CORRECTION

PATENT NO. : 5,675,222
DATED : October 7, 1997
INVENTOR(S) : Hans FLIEGE

It is certified that error appears in the above-identified patent and that said Letters Patent is hereby corrected as shown below:

In column 10, line 12, after 'position', delete "looking" and insert --locking--.

Signed and Sealed this

Twenty-fourth Day of February, 1998

Attest:

BRUCE LEHMAN

Attesting Officer        Commissioner of Patents and Trademarks